(12) United States Patent
Hareuveni et al.

(10) Patent No.: US 11,259,158 B2
(45) Date of Patent: Feb. 22, 2022

(54) METHODS AND DEVICES FOR DETERMINING A SIGNAL IS FROM A VEHICLE

(71) Applicant: Intel Corporation, Santa Clara, CA (US)

(72) Inventors: Ofer Hareuveni, Haifa (IL); Rony Ross, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/882,567

(22) Filed: May 25, 2020

(65) Prior Publication Data

US 2021/0368310 A1    Nov. 25, 2021

(51) Int. Cl.
| | | |
|---|---|---|
| *H04W 4/40* | (2018.01) | |
| *G08G 1/005* | (2006.01) | |
| *G08G 1/01* | (2006.01) | |
| *G08B 21/02* | (2006.01) | |
| *H04M 1/72454* | (2021.01) | |

(52) U.S. Cl.
CPC ............. *H04W 4/40* (2018.02); *G08B 21/02* (2013.01); *G08G 1/005* (2013.01); *G08G 1/01* (2013.01); *H04M 1/72454* (2021.01)

(58) Field of Classification Search
CPC ..... H04W 4/40; H04M 1/72454; G08B 21/02
See application file for complete search history.

(56) References Cited

U.S. PATENT DOCUMENTS

| | | | |
|---|---|---|---|
| 10,665,109 B1* | 5/2020 | Simon | G05D 1/0276 |
| 2009/0059201 A1* | 3/2009 | Willner | G01S 17/894 |
| | | | 356/5.01 |
| 2011/0267222 A1* | 11/2011 | Craig | G01S 3/30 |
| | | | 342/25 B |
| 2012/0119893 A1 | 5/2012 | Cemper | |
| 2014/0357213 A1* | 12/2014 | Tanaka | H04W 4/90 |
| | | | 455/404.1 |
| 2015/0109148 A1 | 4/2015 | Cheatham, III et al. | |
| 2016/0381450 A1 | 12/2016 | Taite et al. | |
| 2017/0263107 A1* | 9/2017 | Doyle | G08B 25/016 |
| 2018/0127042 A1* | 5/2018 | Kerbel | B62J 6/04 |

FOREIGN PATENT DOCUMENTS

| | | |
|---|---|---|
| JP | 2011192043 A | 9/2011 |
| KR | 20170018703 A | 2/2017 |

OTHER PUBLICATIONS

Michael Parker, "Automotive Radar", Digital Signal Processing 101, 2017, pp. 253-276, second edition, chapter 20.
International Search Report issued for the PCT Application No. PCT/US2020/064398, dated Mar. 16, 2021, 12 pages (for informational purposes only).

* cited by examiner

*Primary Examiner* — Benyam Haile
(74) *Attorney, Agent, or Firm* — Viering, Jentschura & Partner MBB

(57) ABSTRACT

A method for generating an alert, the method comprising: identifying a range of frequencies associated with vehicular communication; determining that a frequency of a received signal is within the range of frequencies associated with vehicular communication; determining that the received signal is from a vehicle; and generating the alert that the vehicle is approaching.

19 Claims, 15 Drawing Sheets

FIG 5
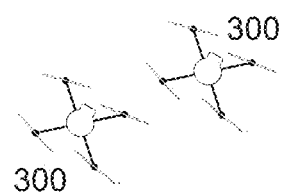
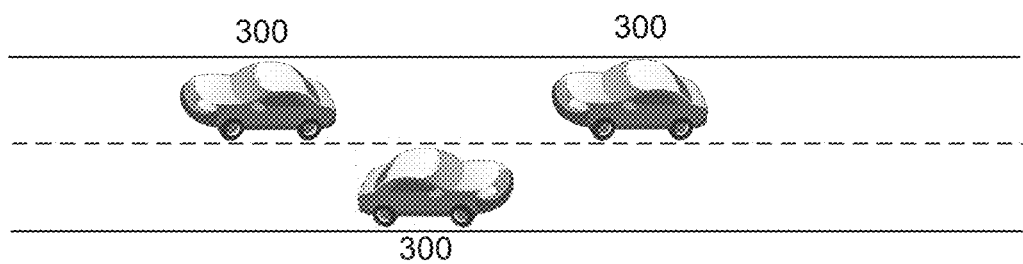
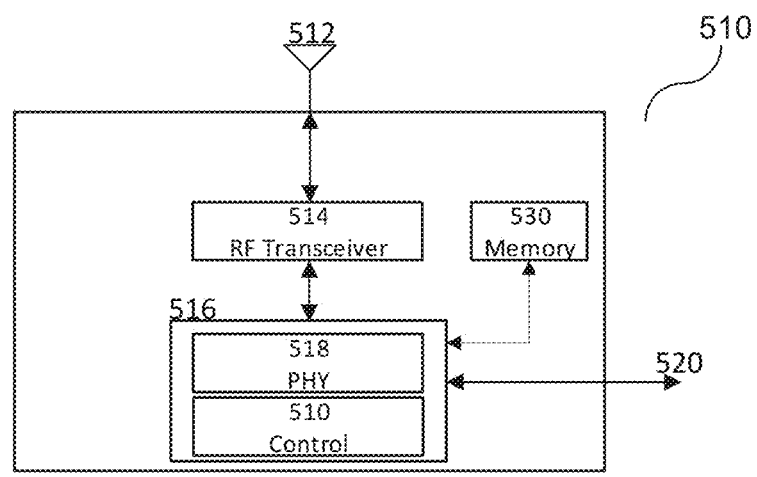

FIG 6

Automotive Radar Frequency Bands

600

| Frequency | Bandwidth | Type of Band |
|---|---|---|
| 24 GHz to 24.25 GHz | 250 MHz | ISM Band |
| 21 GHz to 26 GHz | 5 GHz | Ultra Wide Band (UWB) |
| 76 GHz to 77 GHz | 1 GHz | Automotive Long Range Radar (LRR) Band |
| 77 GHz to 81 GHz | 4 GHz | Automotive Short Range Radar (SRR) Band |

602
604
606
608

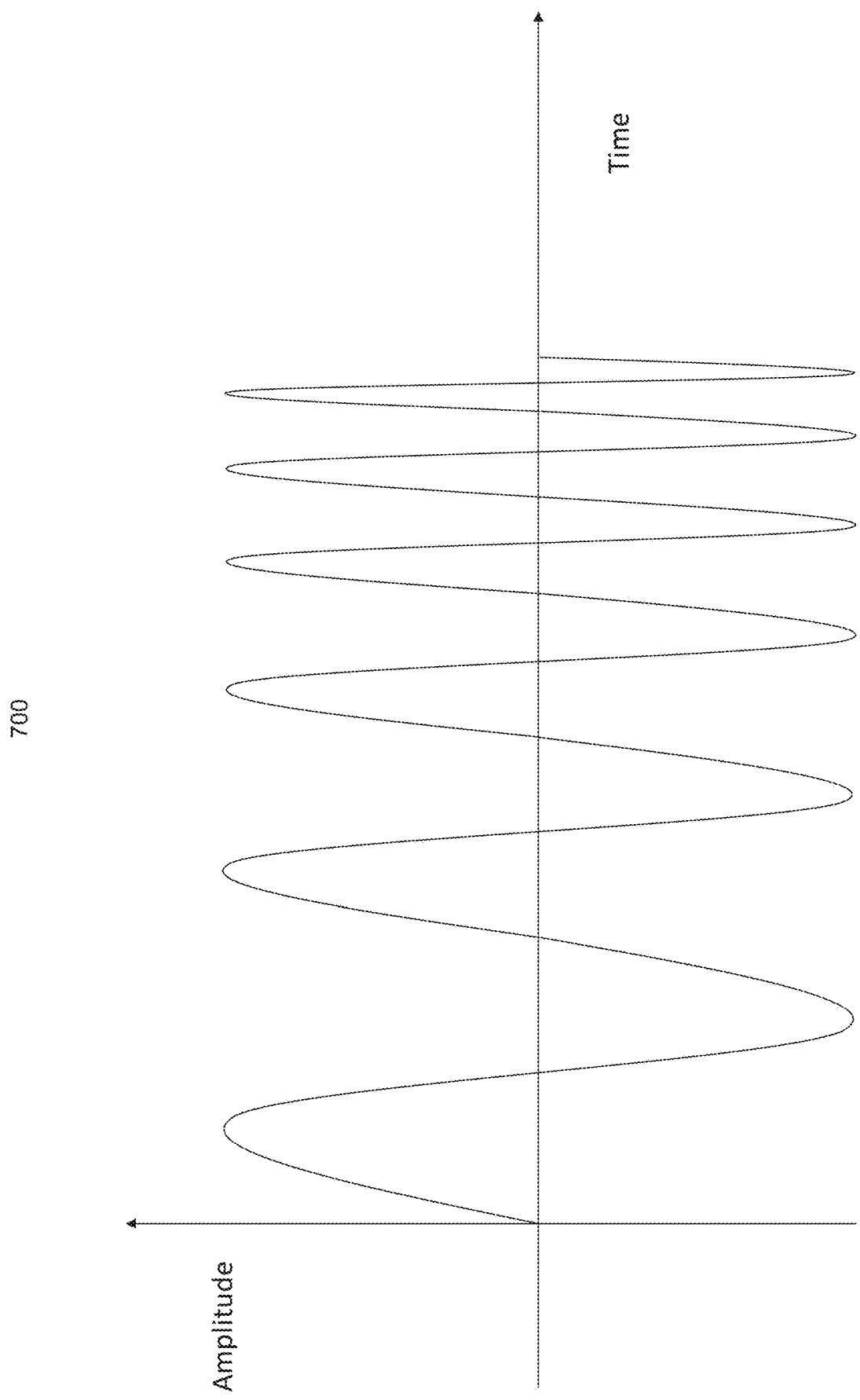

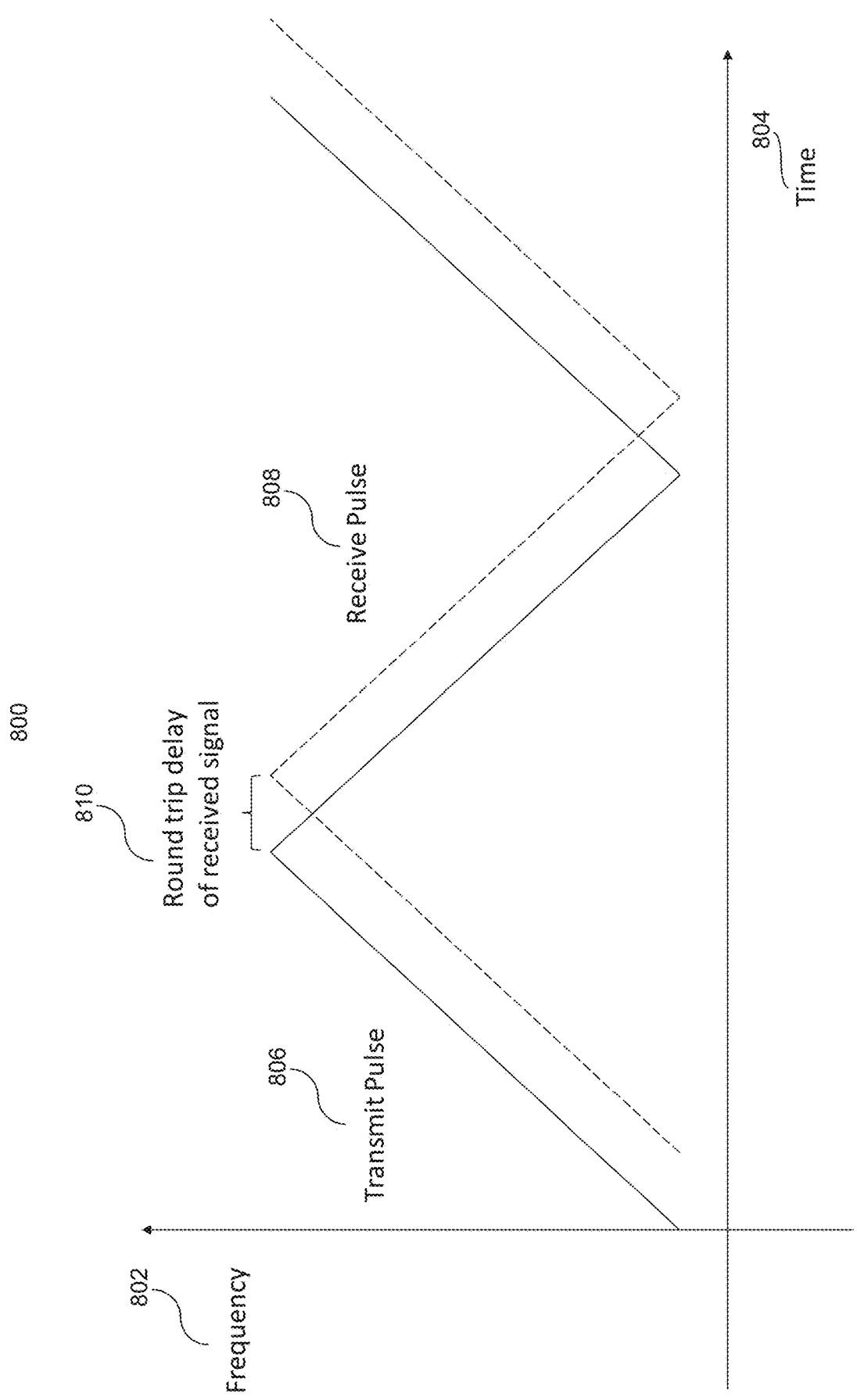

FIG 9

| Typec | LRR | MRR | SRR |
|---|---|---|---|
| Maximum transmit power (EIRP) | 55 dBm | -9 dBm/MHz | -9 dBm/MHz |
| Frequency band | 76-77 GHz | 77-81 GHz | 77-81 GHz |
| Bandwidth Distance range | 600 GHz | 600 GHz | 4 GHz |
| $R_{min} ... R_{max}$ | 10-250 m | 1-100 m | 0.15-30 m |
| Distance Resolution $\Delta R$ | 0.5 m | 0.5 m | 0.1 m |
| Distance Accuracy $\delta R$ | 0.1 m | 0.1 m | 0.02 m |
| Velocity Resolution $\Delta v$ | 0.6 m/s | 0.6 m/s | 0.6 m/s |
| Velocity Accuracy $\delta v$ | 0.1 m/s | 0.1 m/s | 0.1 m/s |
| Angular Accuracy $\delta \varphi$ | 0.1° | 0.5° | 0.1° |
| 3dB beamwidth in azimuth $\pm \varphi_{max}$ | ±15° | ±40° | ±80° |
| 3db beamwidth in elevation $\pm \vartheta_{max}$ | ±5° | ±5° | ±10° |

1402 — Identifying a range of frequencies associated with vehicular communication.

1404 — Determining that a frequency of a received signal is within the range of frequencies associated with vehicular communication.

1406 — Determining that the received signal is from a vehicle.

1408 — Generating the alert based that the vehicle is approaching.

METHODS AND DEVICES FOR DETERMINING A SIGNAL IS FROM A VEHICLE

TECHNICAL FIELD

Various embodiments relate generally to methods and devices for determining if a signal is generated by a vehicle.

BACKGROUND

As technology trends toward noise cancelling and noise isolated headphones and electronic vehicles, the probability of pedestrians or cyclists being alerted to an approaching vehicle has degraded. As pedestrians focus their attention on their communication devices in addition to noise canceling/isolated headphones associated wired or wirelessly (e.g. via Bluetooth) with their communication device, their attention is drawn away from vehicle traffic. Additionally, there is a growing number of noiseless motors and electric vehicles. On the other hand, modern vehicles are equipped with mmWAVE radar systems for driving assistance and autonomous driving. The emergence of 5G cellular and WiGig Wi-Fi in end-user communication devices or User Equipment (UE) devices resulting an integration of mmWAVE transceivers that are typically being used as secondary carrier boosting network performance. These mmWAVE transceivers, with no or minimal hardware modifications, can be used to detect radar signals from approaching vehicles and alert the UE holder. In addition, such transceivers may also be used to transmit an alert from the pedestrian to the approaching vehicle.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows an exemplary network area according to some aspects.

FIG. 6 shows an exemplary range of frequency bands of automotive radar signals according to some aspects.

FIG. 7 shows an exemplary bandwidth of a frequency-modulated continuous wave radar signal according to some aspects.

FIG. 8 shows an exemplary duration of a frequency-modulated continuous wave radar signal according to some aspects.

FIG. 9 shows an exemplary list of vehicular radar types according to some aspects.

FIG. 14 shows an exemplary method for detecting an approaching vehicle according to some aspects.

DESCRIPTION

Figure 1:
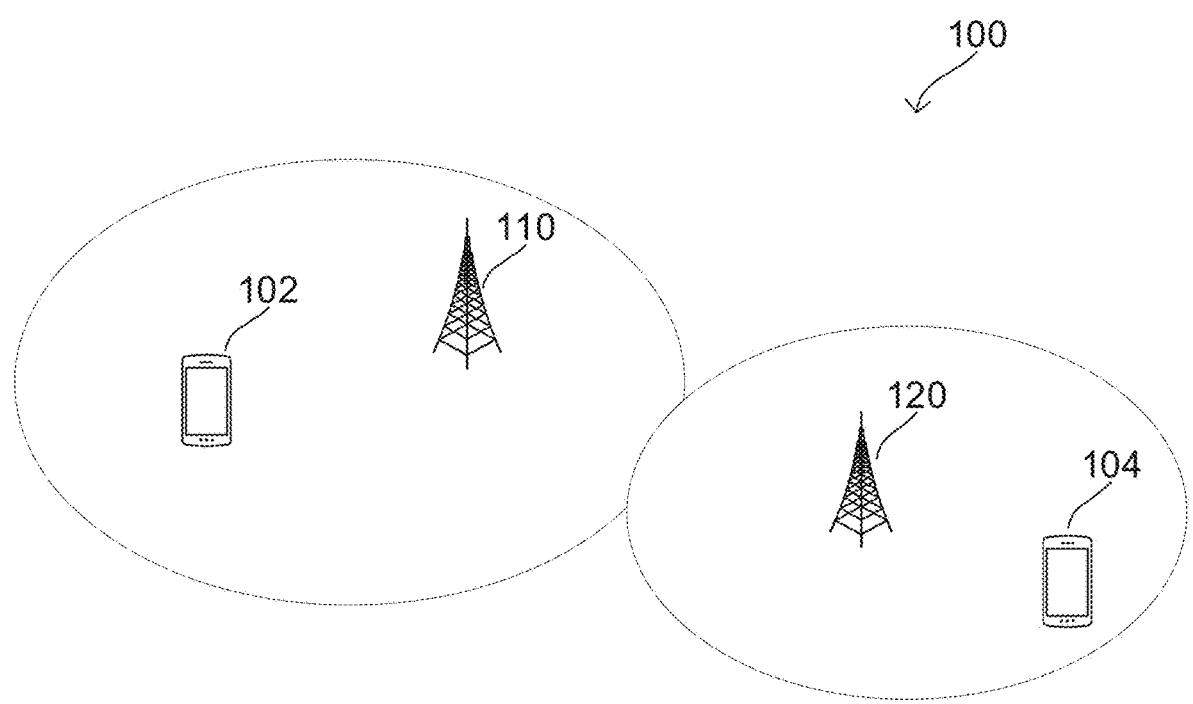
FIG. 1 shows an exemplary radio communication network according to some aspects.

The following detailed description refers to the accompanying drawings that show, by way of illustration, specific details and aspects of embodiments in which the disclosure may be practiced.

The word "exemplary" is used herein to mean "serving as an example, instance, or illustration." Any aspect or design described herein as "exemplary" is not necessarily to be construed as preferred or advantageous over other aspects or designs. The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "reduced subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the wireless transmission of radio signals) and logical transmission (e.g., the transmission of digital data over a logical software-level connection). For example, a processor (or controller or physical layer) may transmit or receive data over a software-level connection with another processor (or controller or physical layer) in the form of radio signals, where the physical transmission and reception is handled by radio-layer components such as RF transceivers and antennas, and the logical transmission and reception over the software-level connection is performed by the processors.

(e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both the incoming and outgoing directions. The term "calculate" encompasses both 'direct' calculations via a mathematical expression/formula/relationship and 'indirect' calculations via lookup or hash tables and other array indexing or searching operations.

Many wireless communication technologies use beamforming to increase link strength between transmitter and receiver. The Third Generation Partnership Project's (3GPP) Fifth Generation (5G) New Radio (NR) standard, for example, includes mechanisms for beamforming in both the transmit and receive directions. Focusing on the terminal side, a terminal device (e.g., a UE) may identify a receive antenna beam and a transmit antenna beam for a given network access node (e.g., gNodeB). In the receive direction, the terminal device can then increase link strength by receiving signals from the network access node with the receive antenna beam. Similarly, in the transmit direction the terminal device can boost link strength by transmitting signals to the network access node with the transmit antenna beam.

Some terminal device manufacturers initially assumed that terminals could select transmit antenna beams (e.g., for mmWave bands) using beam correspondence. That is, once a terminal device performed beamsweeping to identify a receive antenna beam, it could then use a transmit antenna beam that overlaps spatially with the receive antenna beam—in other words, a transmit antenna beam that corresponded with the receive antenna beam. Assuming uplink and downlink channel reciprocity, the terminal device would not need to perform a dedicated transmit beamsweeping procedure to determine the transmit antenna beam; it could instead directly derive the transmit antenna beam from the receive antenna beam that it already acquired. Because transmit beamsweeping requires extra radio resources (both for beamsweeping and for the network access node to send feedback), beam correspondence can avoid extra radio resource allocation in the network side.

However, despite its benefits, beam correspondence may have drawbacks in practice. In real-world use cases, a terminal device's transmit and receive circuitry will not be ideal. This means a transmit antenna beam may operate differently from a receive antenna beam, even if they are steered in the same direction. For instance, a terminal device's transmit phase shifters may be implemented differently from its receive phase shifters, or its internal design may have other imperfections that lead to differences between the transmit and receive paths. As a result, it can be both challenging and expensive for vendors to design an ideal terminal device that can support full beam correspondence, especially in high frequency bands like 5G mmWave.

Since the terminal device tests transmit antenna beams on payload data, the terminal device may not need dedicated radio resources for reference signals. This conserves radio resources and enables the terminal device to update its transmit beam without waiting for the network to allocate dedicated radio resources. Similarly, because the terminal device uses existing control resources for the feedback (e.g., ACKs/NACKs and transmit power control (TPC)), the network access node may not need to allocate extra resources to transmit separate beamsweeping feedback. Moreover, the terminal device can avoid the power penalty of performing a standalone transmit beamsweeping procedure.

Figure 2:
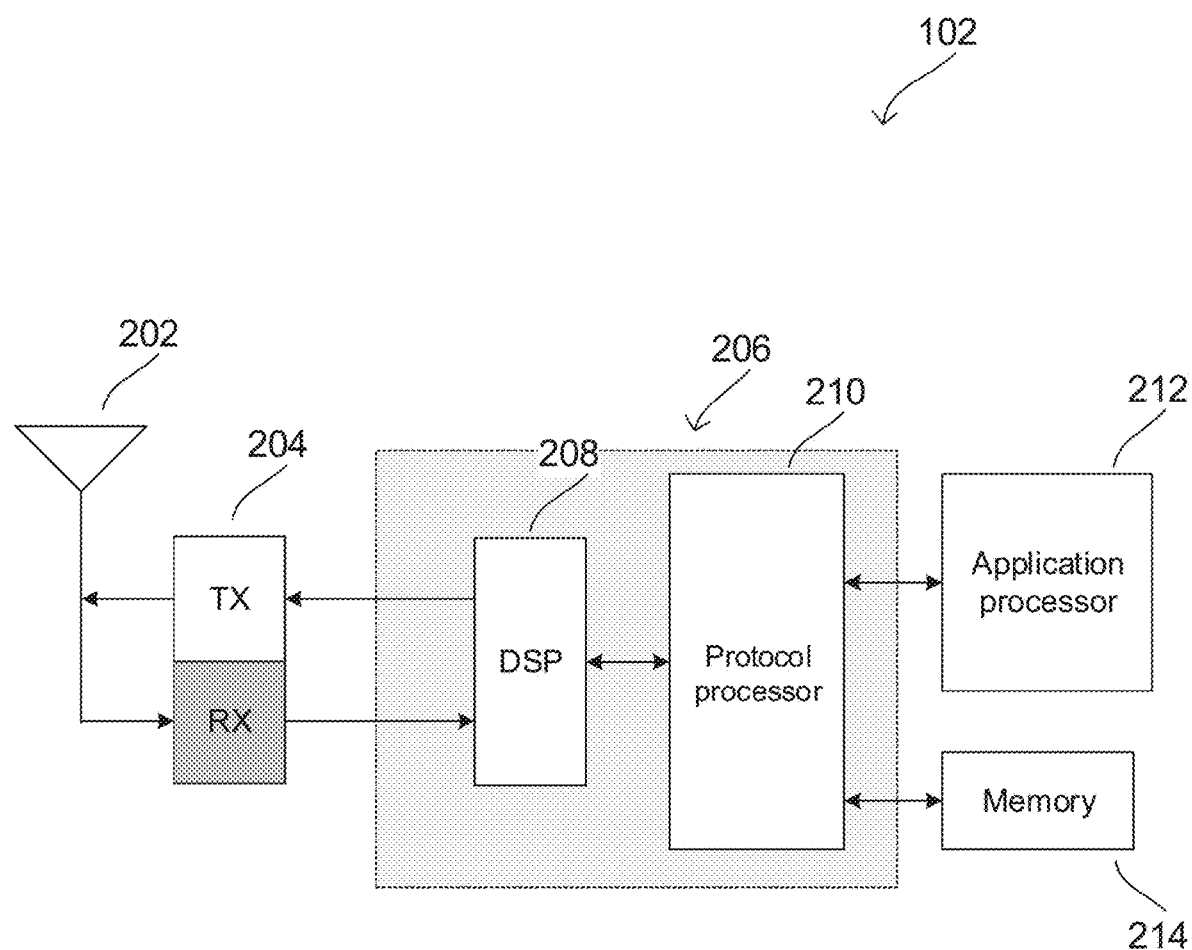
FIG. 2 shows an exemplary internal configuration of a terminal device according to some aspects.

This disclosure will first discuss general configurations for a network, terminal device, and beamforming, and will follow that with a description of beamsweeping techniques that use payload data. FIGS. 1 and 2 depict a general network and device architecture for wireless communications. FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, WiGig, etc.), these examples are illustrative and may be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, 5G NR, and the like, any of which may be applicable to radio communication network 100.

FIG. 2 shows an exemplary internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may be a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select available network access nodes in order to maintain a strong radio access connection with the radio access network of radio communication network 100. For example, terminal device 102 may establish a radio access connection with network access node 110 while terminal device 104 may establish a radio access connection with network access node 112. If the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Autonomous driving systems rely on the accuracy of maps which include features about a vehicle's environment so that a vehicle may safely respond to and/or navigate through its surrounding area. The disclosure herein provides methods and devices which implement mechanisms for communicating features observed about a vehicle's environment to update these maps in order to provide vehicles with accurate and "real-time" maps of its surroundings while taking network resources, such as available frequency-time resources like bandwidth, into consideration.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., and the like in the description and in the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

A "ground vehicle" may be understood to include any type of vehicle, as described above, which is configured to traverse or be driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Accordingly, similar to a ground vehicle having wheels, belts, etc., for providing mobility on terrain, an "aerial vehicle" may have one or more propellers, wings, fans, among others, for providing the ability to maneuver in the air. An "aquatic vehicle" may be understood to be any type of vehicle, as described above, which is capable of being maneuvered on or below the surface of liquid, e.g., a boat on the surface of water or a submarine below the surface. It is appreciated that some vehicles may be configured to operate as one of more of a ground, an aerial, and/or an aquatic vehicle.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of an example, "vehicle operation data" may describe the status of the vehicle such as the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects described herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data, and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Throughout the present disclosure, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle in the manners described in this disclosure.

Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

Figure 3:
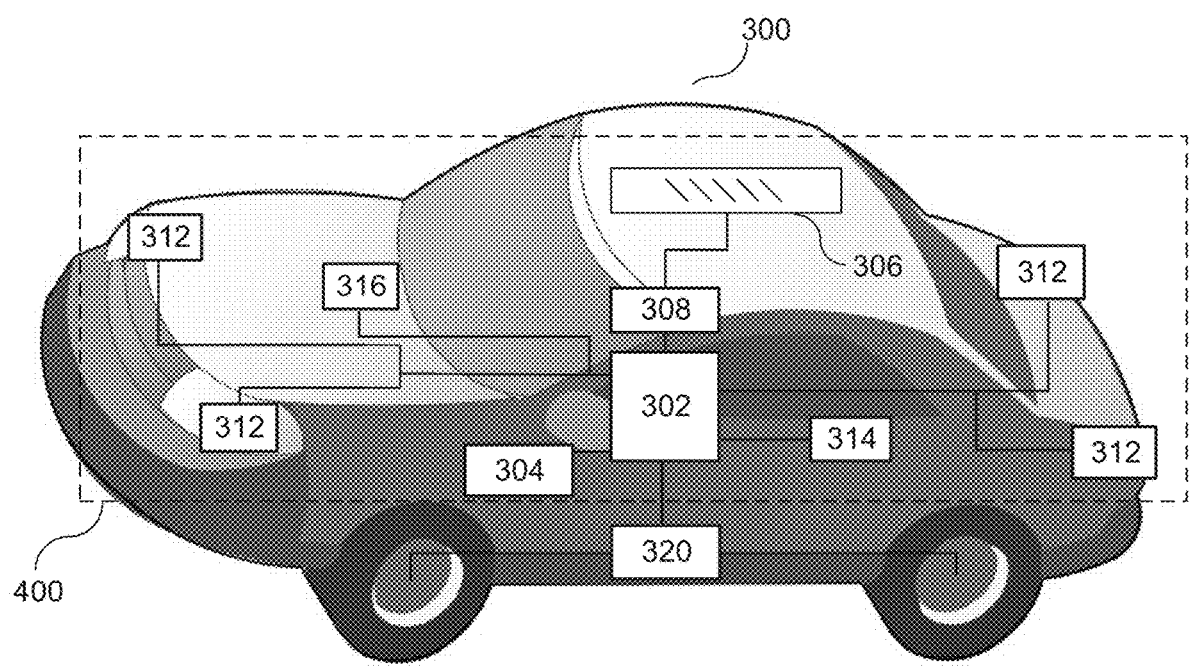
FIG. 3 shows an exemplary autonomous vehicle in accordance with various aspects of the present disclosure.

FIG. 3 shows a vehicle 300 including a mobility system 320 and a control system 400 (see also FIG. 4) in accordance with various aspects. It is appreciated that vehicle 300 and control system 400 are exemplary in nature and may thus be simplified for explanatory purposes. For example, while vehicle 300 is depicted as a ground vehicle, aspects of this disclosure may be equally or analogously applied to aerial vehicles such as drones or aquatic vehicles such as boats. Furthermore, the quantities and locations of elements, as well as relational distances (as discussed above, the figures are not to scale) are provided as examples and are not limited thereto. The components of vehicle 300 may be arranged around a vehicular housing of vehicle 300, mounted on or outside of the vehicular housing, enclosed within the vehicular housing, or any other arrangement relative to the vehicular housing where the components move with vehicle 300 as it travels. The vehicular housing, such as an automobile body, drone body, plane or helicopter fuselage, boat hull, or similar type of vehicular body dependent on the type of vehicle that vehicle 300 is.

In addition to including a control system 400, vehicle 300 may also include a mobility system 320. Mobility system 320 may include components of vehicle 300 related to steering and movement of vehicle 300. In some aspects, where vehicle 300 is an automobile, for example, mobility system 320 may include wheels and axles, a suspension, an engine, a transmission, brakes, a steering wheel, associated electrical circuitry and wiring, and any other components used in the driving of an automobile. In some aspects, where vehicle 300 is an aerial vehicle, mobility system 320 may include one or more of rotors, propellers, jet engines, wings, rudders or wing flaps, air brakes, a yoke or cyclic, associated electrical circuitry and wiring, and any other components used in the flying of an aerial vehicle. In some aspects, where vehicle 300 is an aquatic or sub-aquatic vehicle, mobility system 320 may include any one or more of rudders, engines, propellers, a steering wheel, associated electrical circuitry and wiring, and any other components used in the steering or movement of an aquatic vehicle. In some aspects, mobility system 320 may also include autonomous driving functionality, and accordingly may include an interface with one or more processors 302 configured to perform autonomous driving computations and decisions and an array of sensors for movement and obstacle sensing. In this sense, the mobility system 320 may be provided with instructions to direct the navigation and/or mobility of vehicle 300 from one or more components of the control system 400. The autonomous driving components of mobility system 320 may also interface with one or more radio frequency (RF) transceivers 308 to facilitate mobility coordination with other nearby vehicular communication devices and/or central networking components that perform decisions and/or computations related to autonomous driving.

Figure 4:
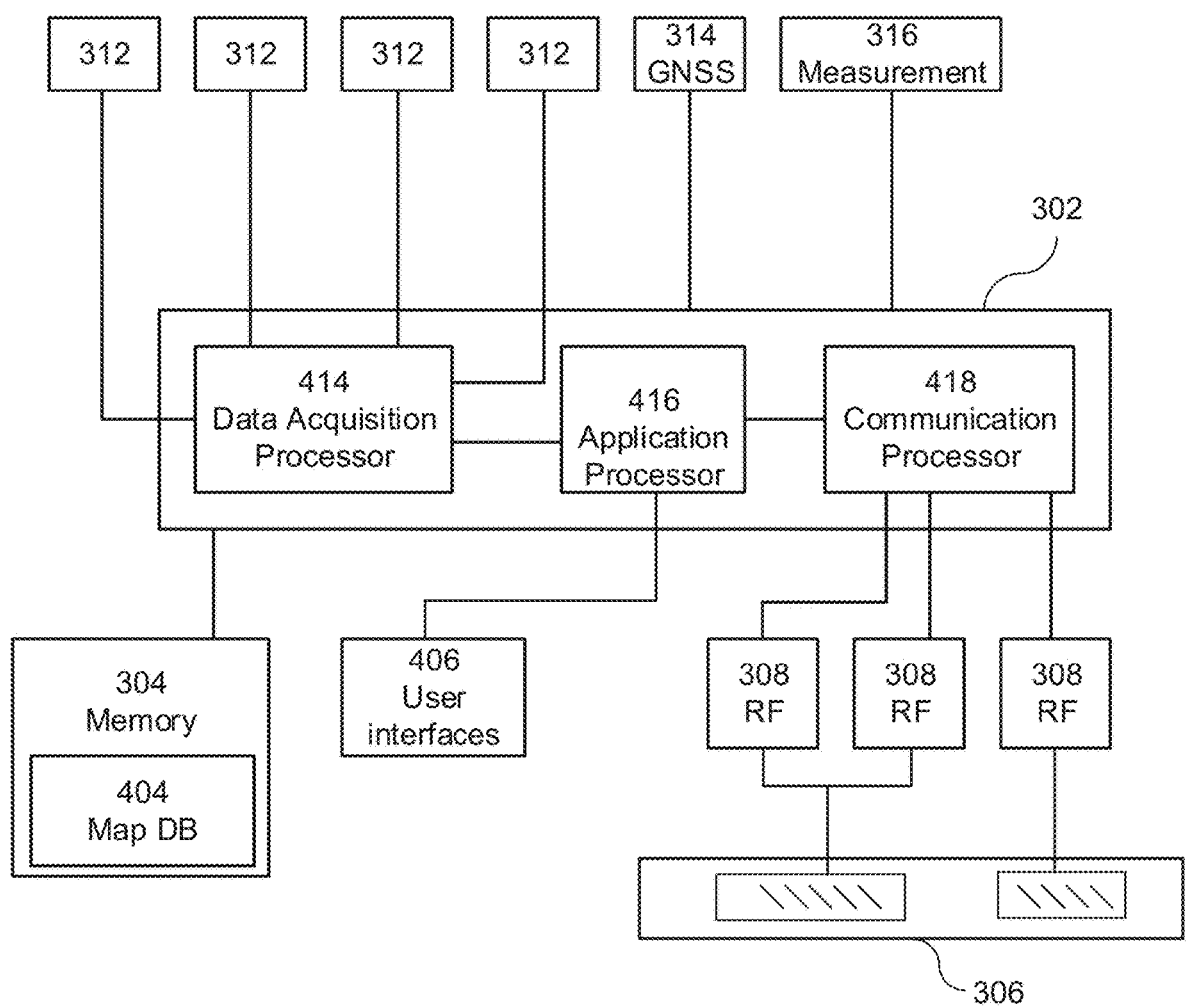
FIG. 4 shows various exemplary electronic components of a safety system of the vehicle in accordance with various aspects of the present disclosure.

The control system 400 may include various components depending on the requirements of a particular implementation. As shown in FIG. 3 and FIG. 4, the control system 400 may include one or more processors 302, one or more memories 304, an antenna system 306 which may include one or more antenna arrays at different locations on the vehicle for radio frequency (RF) coverage, one or more radio frequency (RF) transceivers 308, one or more data acquisition devices 312, one or more position devices 314 which may include components and circuitry for receiving and determining a position based on a Global Navigation Satellite System (GNSS) and/or a Global Positioning System (GPS), and one or more measurement sensors 316, e.g. speedometer, altimeter, gyroscope, velocity sensors, etc.

The control system 400 may be configured to control the vehicle's 300 mobility via mobility system 320 and/or interactions with its environment, e.g. communications with other devices or network infrastructure elements (NIEs) such as base stations, via data acquisition devices 312 and the radio frequency communication arrangement including the one or more RF transceivers 308 and antenna system 306.

The one or more processors 302 may include a data acquisition processor 414, an application processor 416, a communication processor 418, and/or any other suitable processing device. Each processor 414, 416, 418 of the one or more processors 302 may include various types of hardware-based processing devices. By way of example, each processor 414, 416, 418 may include a microprocessor, pre-processors (such as an image pre-processor), graphics processors, a CPU, support circuits, digital signal processors, integrated circuits, memory, or any other types of devices suitable for running applications and for image processing and analysis. In some aspects, each processor 414, 416, 418 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 414, 416, 418 disclosed herein may be configured to perform certain functions in accordance with program instructions which may be stored in a memory of the one or more memories 304. In other words, a memory of the one or more memories 304 may store software that, when executed by a processor (e.g., by the one or more processors 302), controls the operation of the system, e.g., a driving and/or safety system. A memory of the one or more memories 304 may store one or more databases and image processing software, as well as a trained system, such as a neural network, or a deep neural network, for example. The one or more memories 304 may include any number of random-access memories, read only memories, flash memories, disk drives, optical storage, tape storage, removable storage and other types of storage. Alternatively, each of processors 414, 416, 418 may include an internal memory for such storage.

The data acquisition processor 416 may include processing circuitry, such as a CPU, for processing data acquired by data acquisition units 312. For example, if one or more data acquisition units are image acquisition units, e.g. one or more cameras, then the data acquisition processor may include image processors for processing image data using the information obtained from the image acquisition units as an input. The data acquisition processor 416 may therefore be configured to create voxel maps detailing the surrounding of the vehicle 300 based on the data input from the data acquisition units 312, i.e., cameras in this example.

Application processor 416 may be a CPU, and may be configured to handle the layers above the protocol stack, including the transport and application layers. Application processor 416 may be configured to execute various applications and/or programs of vehicle 300 at an application layer of vehicle 300, such as an operating system (OS), a user interfaces (UI) 406 for supporting user interaction with vehicle 300, and/or various user applications. Application processor 416 may interface with communication processor 418 and act as a source (in the transmit path) and a sink (in the receive path) for user data, such as voice data, audio/video/image data, messaging data, application data, basic Internet/web access data, etc. In the transmit path, communication processor 418 may therefore receive and process outgoing data provided by application processor 416 according to the layer-specific functions of the protocol stack, and provide the resulting data to digital signal processor 408. Communication processor 418 may then perform physical layer processing on the received data to produce digital baseband samples, which digital signal processor may provide to RF transceiver 308. RF transceiver 308 may then process the digital baseband samples to convert the digital baseband samples to analog RF signals, which RF transceiver 308 may wirelessly transmit via antenna system 306. In the receive path, RF transceiver 308 may receive analog RF signals from antenna system 306 and process the analog RF signals to obtain digital baseband samples. RF transceiver 308 may provide the digital baseband samples to communication processor 418, which may perform physical layer processing on the digital baseband samples. Communication processor 418 may then provide the resulting data to other processors of the one or more processors 302, which may process the resulting data according to the layer-specific functions of the protocol stack and provide the resulting incoming data to application processor 416. Application processor 416 may then handle the incoming data at the application layer, which can include execution of one or more application programs with the data and/or presentation of the data to a user via a user interface 406. User interfaces 406 may include one or more screens, microphones, mice, touchpads, keyboards, or any other interface providing a mechanism for user input.

The communication processor 418 may include a digital signal processor and/or a controller which may direct such communication functionality of vehicle 300 according to the communication protocols associated with one or more radio access networks, and may execute control over antenna system 306 and RF transceiver(s) 308 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness, the configuration of vehicle 300 shown in FIGS. 3 and 4 may depict only a single instance of such components.

Vehicle 300 may transmit and receive wireless signals with antenna system 306, which may be a single antenna or an antenna array that includes multiple antenna elements. In some aspects, antenna system 402 may additionally include analog antenna combination and/or beamforming circuitry. In the receive (RX) path, RF transceiver(s) 308 may receive analog radio frequency signals from antenna system 306 and perform analog and digital RF front-end processing on the analog radio frequency signals to produce digital baseband samples (e.g., In-Phase/Quadrature (IQ) samples) to provide to communication processor 418. RF transceiver(s) 308 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 308 may utilize to convert the received radio frequency signals to digital baseband samples. In the transmit (TX) path, RF transceiver(s) 308 may receive digital baseband samples from communication processor 418 and perform analog and digital RF front-end processing on the digital baseband samples to produce analog radio frequency signals to provide to antenna system 306 for wireless transmission. RF transceiver(s) 308 may thus include analog and digital transmission components including amplifiers (e.g., Power Amplifiers (PAs), filters, RF modulators (e.g., RF IQ modulators), and digital-to-analog converters (DACs), which RF transceiver(s) 308 may utilize to mix the digital baseband samples received from communication processor 418 and produce the analog radio frequency signals for wireless transmission by antenna system 306. In some aspects, communication processor 418 may control the radio transmission and reception of RF transceiver(s) 308, including specifying the transmit and receive radio frequencies for operation of RF transceiver(s) 308.

According to some aspects, communication processor 418 includes a baseband modem configured to perform physical layer (PHY, Layer 1) transmission and reception processing to, in the transmit path, prepare outgoing transmit data provided by communication processor 418 for transmission via RF transceiver(s) 308, and, in the receive path, prepare incoming received data provided by RF transceiver(s) 308 for processing by communication processor 418. The baseband modem may include a digital signal processor and/or a controller. The digital signal processor may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. The digital signal processor may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, the digital signal processor may include one or more processors configured to retrieve and execute program code that defines control and processing logic for physical layer processing operations. In some aspects, the digital signal processor may execute processing functions with software via the execution of executable instructions. In some aspects, the digital signal processor may include one or more dedicated hardware circuits (e.g., ASICs, FPGAs, and other hardware) that are digitally configured to specific execute processing functions, where the one or more processors of digital signal processor may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of the digital signal processor may be realized as a coupled integrated circuit.

Vehicle 300 may be configured to operate according to one or more radio communication technologies. The digital signal processor of the communication processor 418 may be responsible for lower-layer processing functions (e.g., Layer 1/PHY) of the radio communication technologies, while a controller of the communication processor 418 may be responsible for upper-layer protocol stack functions (e.g., Data Link Layer/Layer 2 and/or Network Layer/Layer 3). The controller may thus be responsible for controlling the radio communication components of vehicle 300 (antenna system 306, RF transceiver(s) 308, position device 314, etc.) in accordance with the communication protocols of each supported radio communication technology, and accordingly may represent the Access Stratum and Non-Access Stratum (NAS) (also encompassing Layer 2 and Layer 3) of each supported radio communication technology. The controller may be structurally embodied as a protocol processor configured to execute protocol stack software (retrieved from a controller memory) and subsequently control the radio communication components of vehicle 300 to transmit and receive communication signals in accordance with the corresponding protocol stack control logic defined in the protocol stack software. The controller may include one or more processors configured to retrieve and execute program code that defines the upper-layer protocol stack logic for one or more radio communication technologies, which can include Data Link Layer/Layer 2 and Network Layer/Layer 3 functions. The controller may be configured to perform both user-plane and control-plane functions to facilitate the transfer of application layer data to and from vehicle 300 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by the controller of communication processor 418 may include executable instructions that define the logic of such functions.

In some aspects, vehicle 300 may be configured to transmit and receive data according to multiple radio communication technologies. Accordingly, in some aspects one or more of antenna system 306, RF transceiver(s) 308, and communication processor 418 may include separate components or instances dedicated to different radio communication technologies and/or unified components that are shared between different radio communication technologies. For example, in some aspects, multiple controllers of communication processor 418 may be configured to execute multiple protocol stacks, each dedicated to a different radio communication technology and either at the same processor or different processors. In some aspects, multiple digital signal processors of communication processor 418 may include separate processors and/or hardware accelerators that are dedicated to different respective radio communication technologies, and/or one or more processors and/or hardware accelerators that are shared between multiple radio communication technologies. In some aspects, RF transceiver(s) 308 may include separate RF circuitry sections dedicated to different respective radio communication technologies, and/or RF circuitry sections shared between multiple radio communication technologies. In some aspects, antenna system 306 may include separate antennas dedicated to different respective radio communication technologies, and/or antennas shared between multiple radio communication technologies. Accordingly, antenna system 306, RF transceiver(s) 308, and communication processor 418 can encompass separate and/or shared components dedicated to multiple radio communication technologies.

Communication processor 418 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 418 may be configured to transmit communications including communications (one-way or two-way) between the vehicle 300 and one or more other (target) vehicles in an environment of the vehicle 300 (e.g., to facilitate coordination of navigation of the vehicle 300 in view of or together with other (target) vehicles in the environment of the vehicle 300), or even a broadcast transmission to unspecified recipients in a vicinity of the transmitting vehicle 300.

Communication processor 418 may be configured to operate via a first RF transceiver of the one or more RF transceiver(s) 308 according to different desired radio communication protocols or standards. By way of example, communication processor 418 may be configured in accordance with a Short-Range mobile radio communication standard such as e.g. Bluetooth, Zigbee, and the like, and the first RF transceiver may correspond to the corresponding Short-Range mobile radio communication standard. As another example, communication processor 418 may be configured to operate via a second RF transceiver of the one or more RF transceiver(s) 308 in accordance with a Medium or Wide Range mobile radio communication standard such as, e.g., a 3G (e.g. Universal Mobile Telecommunications System—UMTS), a 4G (e.g. Long-Term Evolution—LTE), or a 5G mobile radio communication standard in accordance with corresponding 3GPP ($3^{rd}$ Generation Partnership Project) standards. As a further example, communication processor 418 may be configured to operate via a third RF transceiver of the one or more RF transceiver(s) 308 in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, 802.11ay, and the like). The one or more RF transceiver(s) 308 may be configured to transmit signals via antenna system 306 over an air interface. The RF transceivers 308 may each have a corresponding antenna element of antenna system 306, or may share an antenna element of the antenna system 306.

Memory 414 may embody a memory component of vehicle 300, such as a hard drive or another such permanent memory device. Although not explicitly depicted in FIGS. 3 and 4, the various other components of vehicle 300, e.g. one or more processors 302, shown in FIGS. 3 and 4 may additionally each include integrated permanent and non-permanent memory components, such as for storing software program code, buffering data, etc.

The antenna system 306 may include a single antenna or multiple antennas. In some aspects, each of the one or more antennas of antenna system 306 may be placed at a plurality of locations on the vehicle 300 in order to ensure maximum RF coverage. The antennas may include a phased antenna array, a switch-beam antenna array with multiple antenna elements, etc. Antenna system 306 may be configured to operate according to analog and/or digital beamforming schemes in order to maximize signal gains and/or provide levels of information privacy. Antenna system 306 may include separate antennas dedicated to different respective radio communication technologies, and/or antennas shared between multiple radio communication technologies. While shown as a single element in FIG. 3, antenna system 306 may include a plurality of antenna elements (e.g., multiple antenna arrays) positioned at different locations on vehicle 300. The placement of the plurality of antenna elements may be strategically chosen in order to ensure a desired degree of RF coverage. For example, additional antennas may be placed at the front, back, corner(s), and/or on the side(s) of the vehicle 300.

Data acquisition devices 312 may include any number of data acquisition devices and components depending on the requirements of a particular application. This may include: image acquisition devices, proximity detectors, acoustic sensors, etc., for providing data about the vehicle's environment. Image acquisition devices may include cameras (e.g., standard cameras, digital cameras, video cameras, single-lens reflex cameras, infrared cameras, stereo cameras, depth cameras, RGB cameras, etc.), charge coupling devices (CCDs) or any type of image sensor. Proximity detectors may include: radar sensors, light detection and ranging (LIDAR) sensors, mmWave radar sensors, etc. Acoustic sensors may include: microphones, sonar sensors, ultrasonic sensors, etc. Accordingly, each of the data acquisition units may be configured to observe a particular type of data of the vehicle's 300 environment and forward the data to the data acquisition processor 414 in order to provide the vehicle with an accurate portrayal of the vehicle's environment. The data acquisition devices 312 may be configured to implement pre-processed sensor data, such as radar target lists or LIDAR target lists, in conjunction with acquired data.

Measurement devices 316 may include other devices for measuring vehicle-state parameters, such as a velocity sensor (e.g., a speedometer) for measuring a velocity of the vehicle 300, one or more accelerometers (either single axis or multi-axis) for measuring accelerations of the vehicle 300 along one or more axes, a gyroscope for measuring orientation and/or angular velocity, odometers, altimeters, thermometers, etc. It is appreciated that vehicle 300 may have different measurement devices 316 depending on the type of vehicle it is, e.g., car vs. drone vs. boat.

Position devices 314 may include components for determining a position of the vehicle 300. For example, this may include GPS or other GNSS circuitry configured to receive signals from a satellite system and determine a position of the vehicle 300. Position devices 314, accordingly, may provide vehicle 300 with satellite navigation features. In some aspects, the one or more position devices 314 may include components (e.g., hardware and/or software) for determining the position of vehicle 300 by other means, e.g. by using triangulation and/or proximity to other devices such as NIEs.

The one or more memories 304 may store data, e.g., in a database or in any different format, that may correspond to a map. For example, the map may indicate a location of known landmarks, roads, paths, network infrastructure elements, or other elements of the vehicle's 300 environment. The one or more processors 302 may process sensory information (such as images, radar signals, depth information from LIDAR, or stereo processing of two or more images) of the environment of the vehicle 300 together with position information, such as GPS coordinates, a vehicle's ego-motion, etc., to determine a current location of the vehicle 300 relative to the known landmarks, and refine the determination of the vehicle's location. Certain aspects of this technology may be included in a localization technology such as a mapping and routing model.

Furthermore, the control system 400 may include a driving model, e.g., implemented in an advanced driving assistance system (ADAS) and/or a driving assistance and automated driving system. By way of example, the control system 400 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 300 may include the control system 400 as also described with reference to FIG. 4. The vehicle 300 may include the one or more processors 302 integrated with or separate from an engine control unit (ECU) which may be included in the mobility system 320 of the vehicle 300. The control system 400 may, in general, generate data to control or assist to control the ECU and/or other components of the vehicle 300 to directly or indirectly control the movement of the vehicle 300 via mobility system 320. The one or more processors 302 of the vehicle 300 may be configured to implement the aspects and methods described herein.

The components illustrated in FIGS. 3 and 4 may be operatively connected to one another via any appropriate interfaces. Furthermore, it is appreciated that not all the connections between the components are explicitly shown, and other interfaces between components may be covered within the scope of this disclosure.

FIG. 5 shows an exemplary network area 500 according to some aspects. Network area 500 may include a plurality of vehicles 300, which may include, for example, drones and ground vehicles. Any one of these vehicles may communicate with one or more other vehicles 300 and/or with NIE 510. NIE 510 may be a base station (e.g. an eNodeB, a gNodeB, etc.), a road side unit (RSU), a road sign configured to wirelessly communicate with vehicles and/or a mobile radio communication network, etc., and serve as an interface between one or more of vehicles 300 and a mobile radio communications network, e.g., an LTE network or a 5G network.

NIE 510 may include, among other components, at least one of an antenna system 512, a RF transceiver 514, and a baseband circuit 516 with appropriate interfaces between each of them. In an abridged overview of the operation of NIE 510, NIE 510 may transmit and receive wireless signals via antenna system 512, which may be an antenna array including multiple antenna arrays. Antenna system 512 may include multiple antenna elements (e.g., multiple antenna arrays) in order to employ multiple-input and multiple-output (MIMO) methods and schemes.

RF transceiver 514 may perform transmit and receive RF processing to convert outgoing baseband samples from baseband circuit 516 into analog radio signals to provide to antenna system 512 for radio transmission and to convert incoming analog radio signals received from antenna system 512 into baseband samples to provide to baseband circuit 516. Accordingly, RF transceiver 514 may be configured to operate similarly to the RF transceiver(s) described in FIGS. 3 and 4, albeit perhaps on a much larger scale (e.g., amplifiers to transmit higher power signals, etc.).

Baseband circuit 516 may include a controller 510 and a physical layer processor 518 which may be configured to perform transmit and receive PHY processing on baseband samples received from RF transceiver 514 to provide to a controller 510 and on baseband samples received from controller 510 to provide to RF transceiver 514. In some aspects, the baseband modem 516 may be located external to the NIE 510, e.g., at a centralized location of a mobile radio communication network. Controller 510 may control the communication functionality of NIE 510 according to the corresponding radio communication technology protocols, which may include exercising control over antenna system 512, RF transceiver 514, and physical layer processor 518. Each of RF transceiver 514, physical layer processor 518, and controller 510 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. NIE 510 may also include an interface 520 for communicating with (e.g. receiving instructions from, providing data to, etc.) with a core network according to some aspects.

Additionally, NIE 510 may include a memory 530, which may be internal to NIE 510 (as shown in FIG. 5) or external to NIE 510 (not shown). Memory 530 may store one or more maps of the coverage area of NIE 510 among other information. Each of the one or more maps may include a static layer depicting environmental elements that remain largely unchanged over longer periods of time (e.g., roads, structures, trees, etc.) and/or a dynamic layer with more frequent changes (e.g., vehicles, detected obstacles, construction, etc.). In some aspects, memory 530 may also store maps corresponding to one or more neighboring areas of NIE 510 so as to provide vehicles within its coverage area with information of neighboring coverage areas (e.g., to facilitate the process when a vehicle moves to the coverage of the neighboring NIE).

User Equipment devices may take advantage of technology vehicles use when transmitting signals, for example as described in FIGS. 3-5 to alert a user of an approaching vehicle. With the advancement of silent electronic cars and noise cancelling headphones noise isolated headphones, the likelihood that a pedestrian or cyclist is aware of an approaching vehicle has degraded. As pedestrian's focus attention on mobile devices, alerts on devices may be used to alert users of an oncoming vehicle. Modern cars are likely to be equipped with mmWAVE radar systems for driving assistance and autonomous driving. The emergence of 5G cellular and WiGig Wi-Fi in User Equipment (UE) has resulted in integration of mmWAVE transceivers in UEs that may be used as secondary carrier boosting network performance.

These mmWAVE transceivers, with no or minimal hardware modifications, can be used to detect radar signals from approaching vehicles and alert the UE holder upon detection of an approaching vehicle. An alert my take many forms such as: visual and/or audio alert, vibration, UE GUI, pause audio/video. In addition, mmWAVE transceivers may also be used to transmit an alert from the UE to the approaching vehicle and trigger the vehicle to flash headlights, sound an audible horn, or slow its velocity. Alternatively, the alert may cause the UE to turn on a flashlight to make a user of a UE visible to the vehicle.

Pedestrian Safety may be accomplished by enhancing mmWAVE transceivers and a software stack in UEs to enable dual use for communication (5G or WiGig) and for user alerts. While the mmWAVE transceiver is not in use (or not critical for use) as a secondary carrier for communication, it may be used as a vehicular radar detector used to trigger multiple actions upon vehicle radar detection. For example, upon vehicle radar detection, a UE may be triggered to alert the user with an audible and/or visual and/or vibration alert.

Additionally, user awareness of an oncoming vehicle may be increased by pausing audio applications, lowering audio volume, and disabling headphones of a UE. Further actions of a UE may be triggered to enhance pedestrian or cyclist safety. The UE may be triggered to generate an alert designed to make a user of a UE more conspicuous. For example, the UE may be triggered to project light bright enough to be visible or generate sound loud enough to be heard from an approaching vehicle.

For additional safety, upon detecting an oncoming vehicle a UE may broadcast an alert signal configured for communication with a vehicular driving assistance or autonomous driving system of an approaching vehicle. The alert signal may be configured to be received by the automotive radar receiver.

If the oncoming vehicle poses a risk of collision with the pedestrian using a UE with adaptive noise cancelation (ANC) headphones, the alert can take advantage of characteristics of ANC headphones. For example, in addition to lowering volume or disabling playback of audio, the alert can disable specific cancelation of external noise. For example, noise coming from a specific direction such as behind or to the side of a pedestrian, or specific sound spectral patterns such as those produced by a moving motor vehicle.

Vehicular radar systems are using mmWAVE transceivers to measure distance and angle to objects reflecting the radar signal. The spectrum allocation for vehicular radar systems may operate in multiple wavelengths within the mmWAVE range.

Generated alerts may also be associated with an urgency level. For example, if it is determined that the pedestrian is at a high risk for being struck by on oncoming vehicle, the alert may be more severe than an alert associated with a low risk of being struck. An urgency level may depend on the probability of a collision between a pedestrian or cyclist using a UE and a vehicle.

Machine Learning may be implemented to determine the probability of a collision. For example, a probability model in conjunction with a neural network may be used to determine the likelihood of a collision. An alert and based on urgency level may be sent based on the prediction of the machine learning implementation.

For example, if a pedestrian is walking in the direction of an oncoming vehicle, but based on map data the neural network determines the pedestrian is not likely to walk into a street, a low lever alert might be sent or an alert may not be sent at all.

Machine learning training techniques for neural networks, such as those described with regard to autonomous vehicles may be used to train machine learning for UEs to determine if an alert should be generated.

Real world data may be used to train for a neural network for identifying a risk of collision and generate an alert. Input for training may include vehicular sounds, such as the noise a gasoline engine in motion generates. Additionally, inputs such as map/navigator/cross roads, traffic lights, user position (pedestrian on street vs. off street, etc.) may be included in training the neural network. Further considerations for making predictions may include the type of vehicle. Vehicle type may be determined by classification of radar signals, sample to sample doppler analysis, or signal strength. Tracking "sample to sample" variations, of all input may make for a more robust neural network.

FIG. 6 shows automotive radar frequency bands 600. The first band 602 is an ISM Band operating in the 24 GHz to 24.25 GHz frequency range. The second band 604 is an Ultra Wide Band 604 operating in the 21 GHz to 26 GHz frequency range. The third band 606 is an Automotive Long-Range Radar Band operating in the 76 GHz to 77 GHz frequency range. The fourth band 608 is an Automotive Short-Range Radar Band operating in the 77 GHz to 81 GHz frequency range. It should be noted that other frequency ranges may be used for automotive radar bands.

Licensed and unlicensed mmWAVE communication is deploying in a similar spectrum. The harmonized licensed mmWAVE spectrum for 5G may include the 26 GHz, 28 GHz, 37 GHz and 39 GHz bands. While the unlicensed mmWAVE spectrum for WiGig may utilize the 60 GHz band. It should be noted that other frequency ranges may be used for 5G and WiGig bands. Modifying a 5G/WiGig mmWAVE communication transceiver to cover the vehicular radar spectrum should be relatively seamless.

Automotive radar system are typically transmitting frequency-modulated continuous wave (FMCW) or chirp pulses in a mmWAVE band.

FIG. 7 shows an exemplary bandwidth of FMCW signal 700 in the mmWAVE band.

FIG. 8 shows an exemplary frequency modulation 800 of FMCW signal 700. For example, FMCW may be a Short-Range Vehicular Radar (SRR). Frequency modulation 800 illustrates the change in frequency 802 over time 804. Furthermore, the differences between the frequencies of transmitted chirp pulse 806 and received chirp pulse 808 are shown. Differences in frequency between the transmitted chirp pulse 806 and the received chirp pulse 808 may occur because of delay 810.

FIG. 9 shows exemplary vehicular radar types 900. Different vehicular radar types include long-range radar (LRR) 902 mid-range radar (MRR) 904, and short-range radar (SRR) 906. As FIG. 9 shows, the some of the vehicular frequency bands for automotive radar types. Therefore, a 5G/WiGig may be modified to operate in the vehicular frequency bands to detect a vehicle as the source of a received signal.

Figure 10:
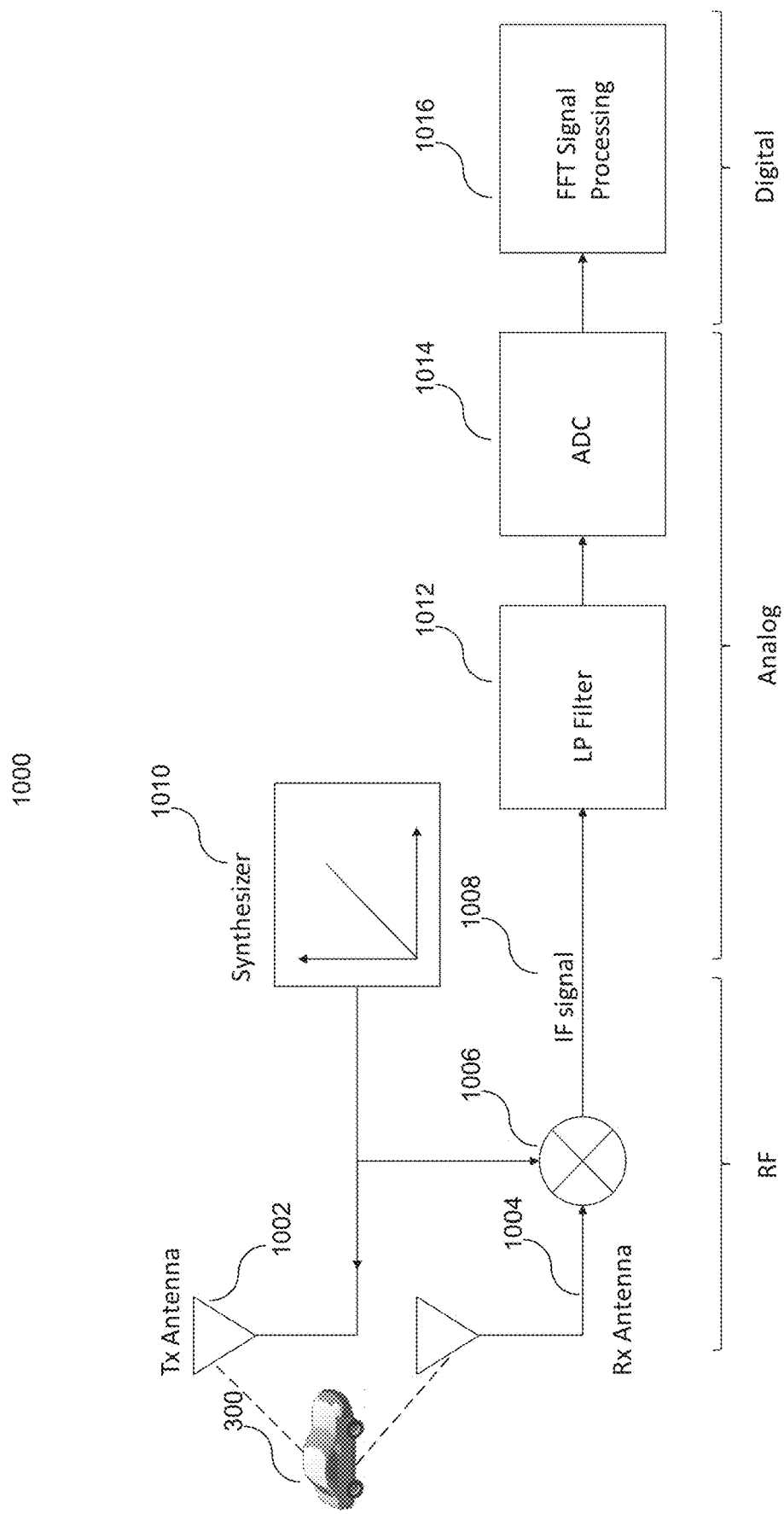
FIG. 10 shows an exemplary architecture of a vehicular radar transceiver according to some aspects.

FIG. 10 shows an exemplary architecture 1000 of a vehicular radar receiver of vehicle 300. Architecture 1000 may include a radio frequency transceiver 308. Transceiver 308 may include Tx antenna 1002, Rx antenna 1004, mixer 1006, and synthesizer 1010. Mixer 1006 may generate intermediate frequency signal 1008 for input into loop filter 1012. Loop filter 1012 may be connected to Analog to Digital converter 1014 to convert to the signal to a digital format. Signal processing 1016 may transform the signal. For example, using a Fast Fourier Transformation (FFT).

Figure 11:
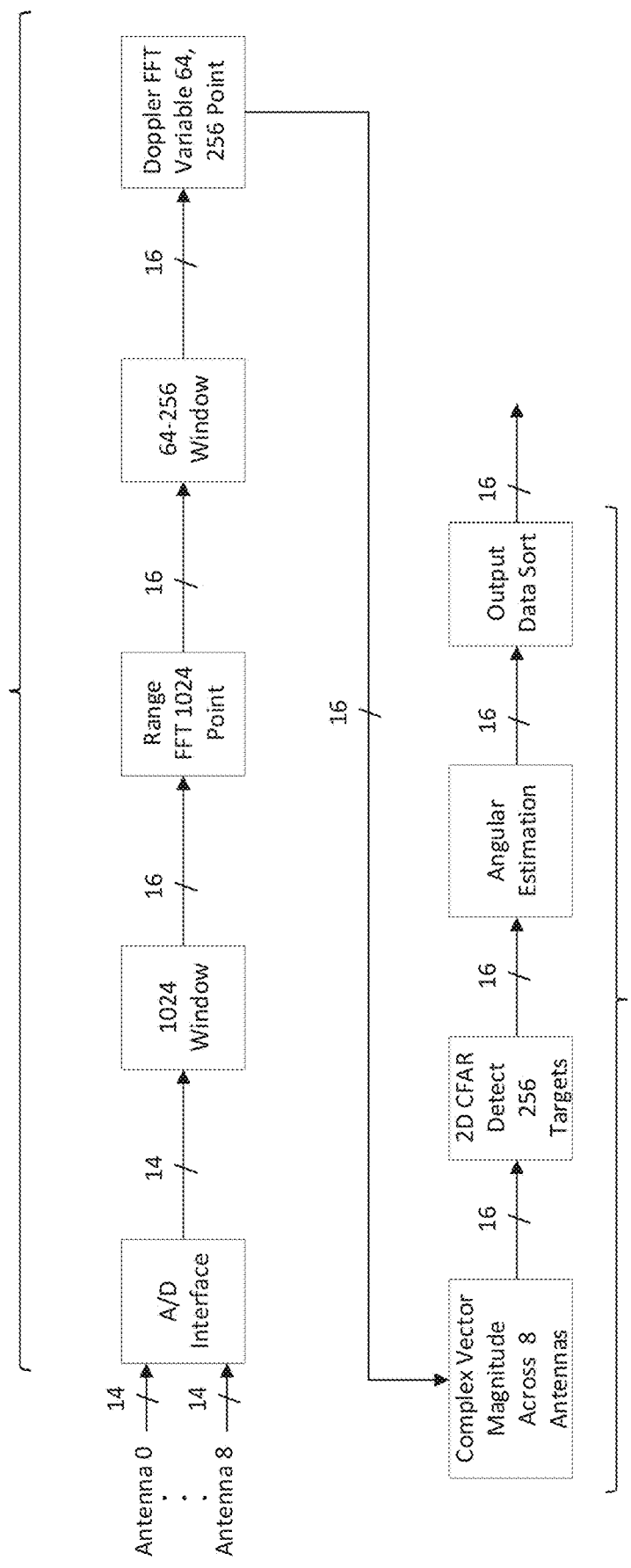
FIG. 11 shows an exemplary stack of a vehicular radar receiver according to some aspects.

FIG. 11 shows an exemplary solution stack 1100 of an automotive radar receiver. Stack 1100 may include hardware and software components. Stack 1100 shows that the baseband processor of an automotive radar receiver is similar, or a subset, to that of a mmWAVE 5G/WiGig receiver.

An mmWAVE 5G/WiGig receiver of a UE may require modifications for the detection of automotive radar signals. Because automotive radar signals operate in different frequency bands than typical 5G/WiGig communication, the frequency, dynamic range and bandwidth of an mmWAVE 5G/WiGig receiver should be configurable to allow detection of desired vehicular radar signals.

Additionally, 5G/WiGig modems may require modifications for detection of automotive radar signals. Hardware modifications may be required to track doppler and classify the pulse of a vehicular radar signal such as a chirp or a frequency modulated continuous wave. Furthermore, parallel 5G/WiGig modem elements may be required to detect multiple vehicular radar signals from multiple vehicles. It may also be possible to modify the 5G/WiGig modem to process multiple frames. For example, processing a sliding window of Analog to Digital samples.

In one implementation, the 5G/WiGig receiver may employ frequency missing to convert a received vehicular radar signal to a fixed intermediate frequency for easier processing. A Phase Locked Loop (PLL) circuit have a configurable frequency range to allow for receiving automotive radar signals. The 5G/WiGig receiver may use a mixer to down convert a Radio Frequency (RF) signal to a baseband signal and determine the signal is from a vehicle from the specific frequency modulation characteristics.

Additional processors may be required to process vehicular radar signals. Locating the source of a radar signal may be the first step. Angle of arrival estimation and time-delay of arrival estimation may be used to determine the location of the source of an airborne radar based on its emission. Combining multiple angle of arrival estimations may be used to triangulate the position of the source of the radar signal. Simultaneous analysis of received signals may be allow for faster processing of radar signals. A vehicular radar signal may be detected over time to determine if the vehicle is approaching or moving away.

Pulse classification may perform two types of pulse feature analysis. Firstly, an inter-pulse analysis is used to determine the pulse width and pulse repetition period timing parameters of the signal. Secondly, Intra-pulse analysis estimates the frequency and phase parameters of the signal within a pulse width. The estimated parameters may be used to classify the signal by matching the received parameters with a pulse database. The pulse database may contain all possible information associated with an emitted vehicular radar signal.

Figure 12A:
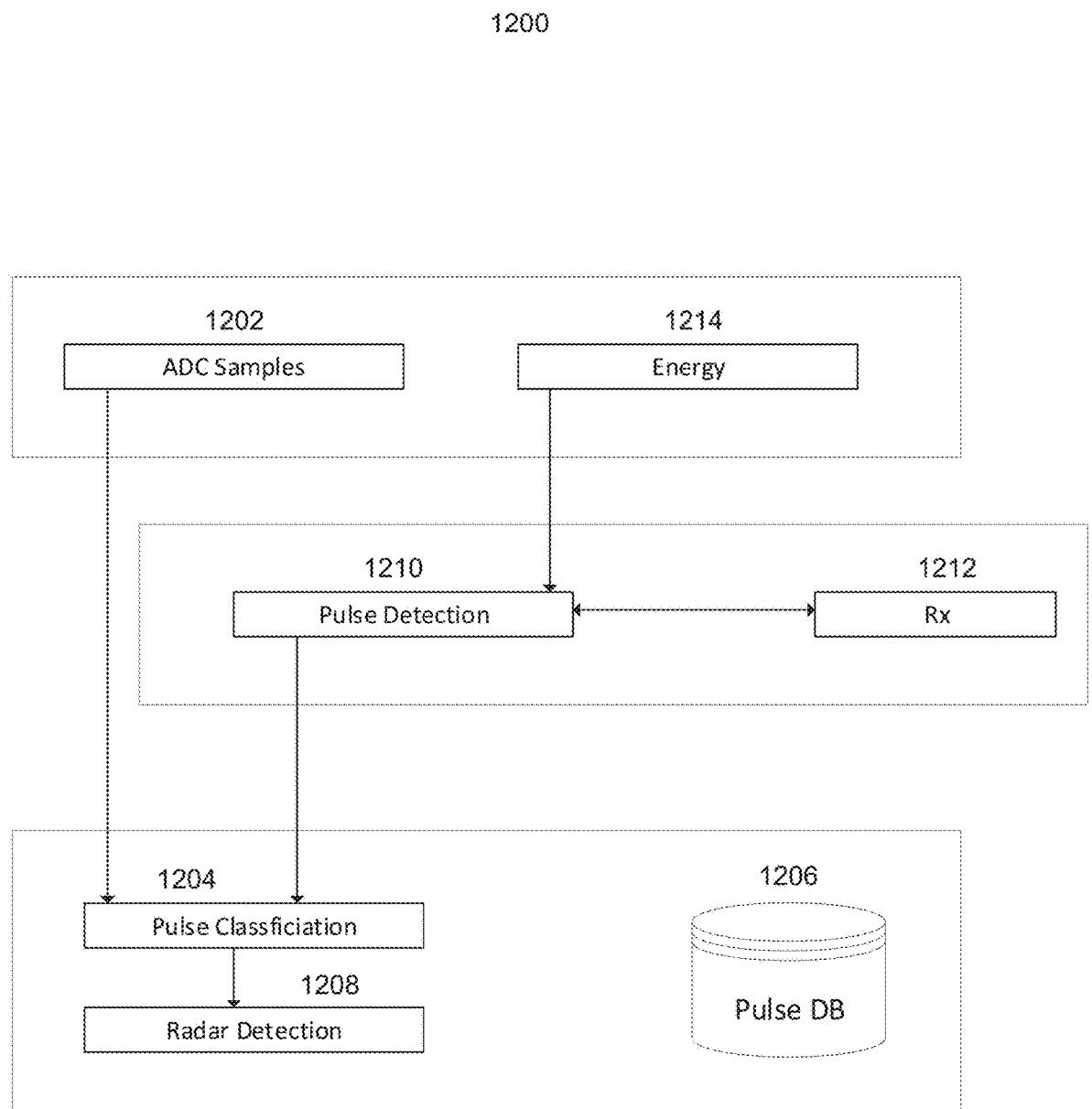
FIGS. 12A and 12B show exemplary flow chart of pulse detection according to some aspects

FIG. 12A shows an exemplary flow chart for state machine 1200 for classification of signals. ADC samples 1202 may be classified in pulse classification module 1204. Pulse classification module may use pulse database 1206 to classify ADC samples. Radar detection module 1208 can detect which of the classified pulses are automotive radar signals. For example, the flow of classification of ADC samples into radar signals, used for detection of weather and military radar detection in 5 GHz Wi-Fi (Dynamic Frequency Selection channels) may be reused for detecting automotive radar signals and determining false detections. Pulse detection module 1210 receive as pulse signal as input from Receiver 1212. Pulse detection module 1210 may convert input pulse signal from analog to digital format so prior to classifying the pulse at pulse classification module 1204. Pulse detection module 1210 may also take in as input energy level 1214 to detect the energy level or frequency of the signal and determine it corresponds to the desired channel. Flows such as the one described above have been proven to be feasible for implementation on existing Wi-Fi devices.

Figure 12B:
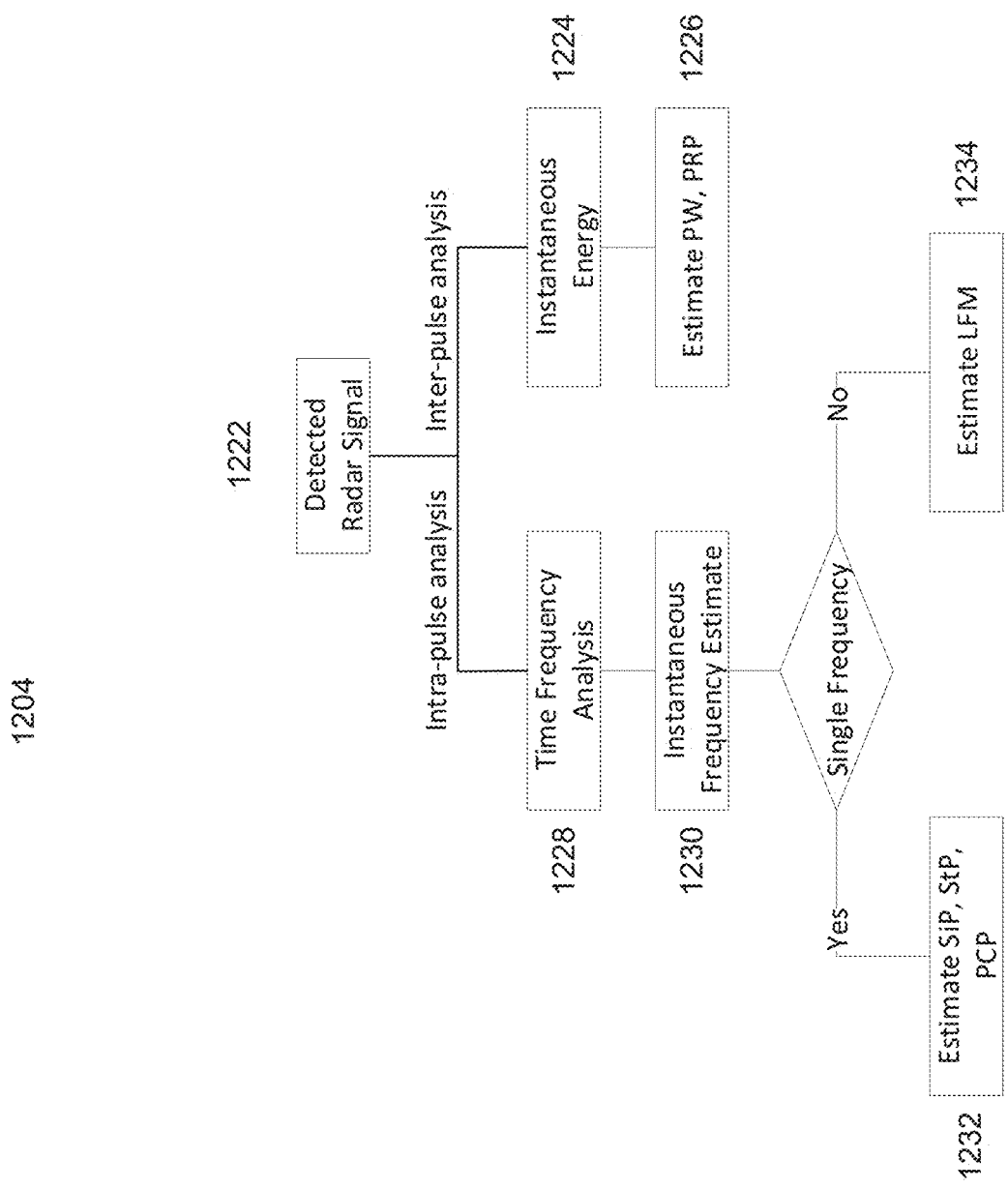

FIG. 12B shows an exemplary pulse classification module 1204 in more detail. To classify detected pulses, pulse classification module 1204 may estimate parameters of detected radar signal 1222. After estimating the pulse or signal parameters, pulse classification module 1204 may match the parameters with pulse database 1206 to determine the classification of the pulse. Pulse classification module 1204 conduct intra-pulse and inter-pulse analysis of the radar signal. As part of the inter-pulse analysis, pulse classification module 1204 may include instantaneous energy analysis 1224 to estimate parameters 1226. For example, as part of the inter-pulse analysis, estimates for pulse width and pulse repetition period may be estimated. As part of the intra-pulse analyses, pulse classification module 1204 may include time frequency analysis 1228 and instantaneous frequency estimate 1230. Additionally, the pulse is determined to be a single frequency or not. For non-single frequency pulses 1234, Linear Frequency Modulation pulse parameters may be estimated. For single frequency pulses 1232, phase coded pulse, simple pulse, or staggered pulse parameters may be estimated. Any combination of estimated parameters may be used to match against pulse database 1206 to classify the radar signal. It should be noted that other classification models, estimating other pulse parameters may be used to classify pulses.

Figure 13:
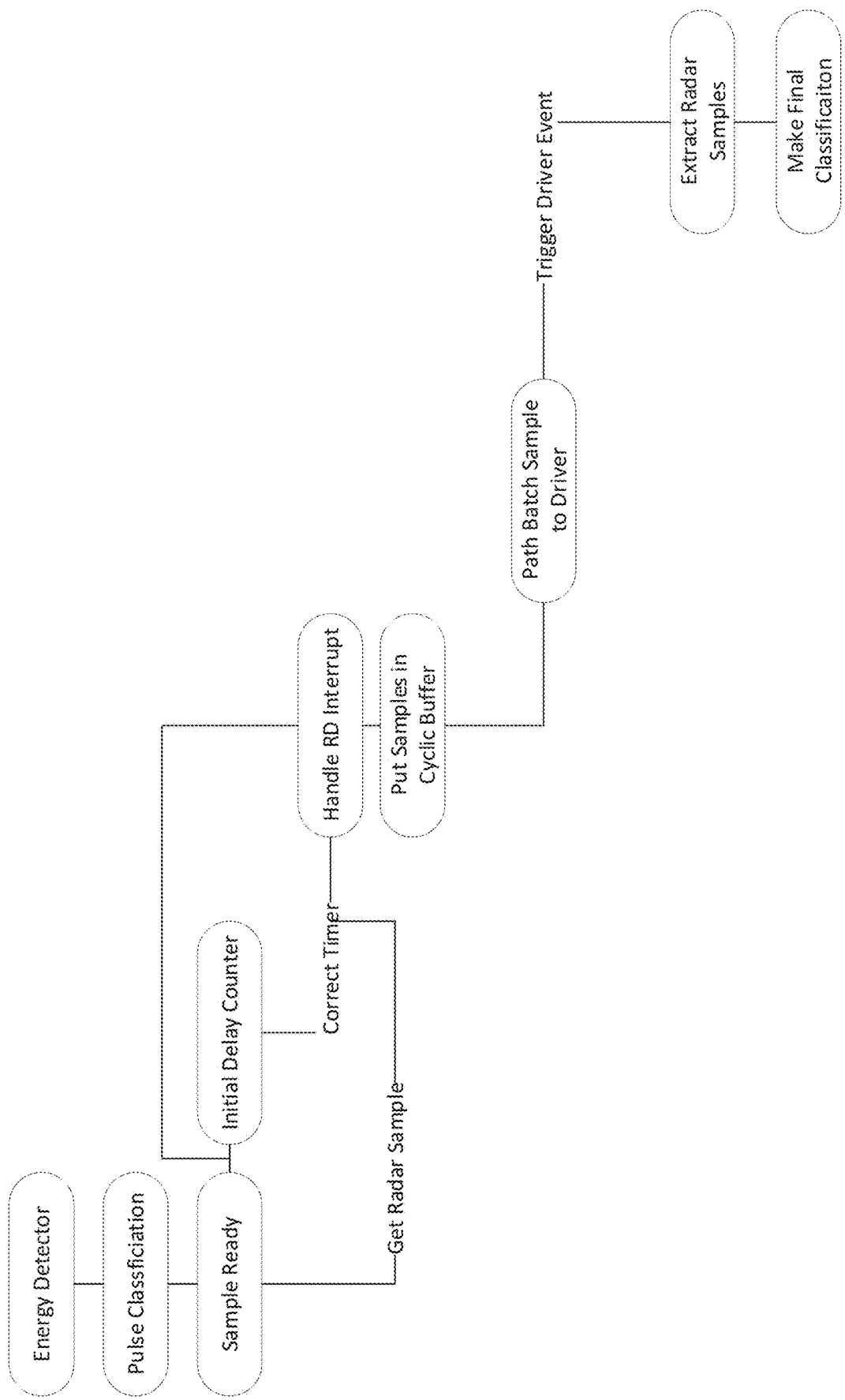
FIG. 13 shows an exemplary flow chart for detecting an approaching vehicle according to some aspects.

FIG. 13 shows an exemplary flow chart 1300 for implementing the detection of an approaching vehicle.

FIG. 14 shows an exemplary method 1400 for identifying the source of a signal is a vehicle. Method 1400 includes identifying a range of frequencies associated with vehicular communication 1402; determining that a frequency of a received signal is within the range of frequencies associated with vehicular communication 1404; determining that the received signal is from a vehicle 1406; and generating the alert that the vehicle is approaching 1408.

In the following, various aspects of the present disclosure will be illustrated:

In Example 1, a communication circuitry for generating an alert, the communication circuitry includes a receiver configured to receive a radio frequency signal; the communication circuitry further includes one or more processors configured to: identify a range of frequencies associated with vehicular communication; determine that a frequency of a received signal is within the range of frequencies associated with vehicular communication; determine that the received signal is from a vehicle; and generate the alert that the vehicle is approaching.

In Example 2, the subject matter of Example(s) 1, includes wherein the one or more processors are further configured to transmit a detection signal to the vehicle.

In Example 3, the subject matter of Example(s) 1 and 2, includes wherein the one or more processors are further configured to determine that a source of the signal is getting closer.

In Example 4, the subject matter of Example(s) 1-3, further includes wherein the alert includes instructions to generate an audible sound.

In Example 5, the subject matter of Example(s) 1-4, further includes wherein the alert includes instructions to generate a visual indication.

In Example 6, the subject matter of Example(s) 1-5, further includes wherein the alert further includes instructions to generate the audible sound as a gas engine vehicle sound.

In Example 7, the subject matter of Example(s) 1-6, further includes wherein the alert further includes instructions to generate the audible sound as a vehicle horn sound.

In Example 8, the subject matter of Example(s) 1-7, further includes wherein the alert is associated with an urgency level.

In Example 9, the subject matter of Example(s) 1-8, further includes wherein a user equipment is configured to vibrate upon receipt of the alert.

In Example 10, the subject matter of Example(s) 1-9, further includes wherein the communication circuitry is further configured to generate instructions to disable audio playback of a user equipment.

In Example 11, the subject matter of Example(s) 1-10, further includes wherein the communication circuitry is further configured to generate instructions to lower a volume of a user equipment.

In Example 12, the subject matter of Example(s) 1-11, further includes wherein the communication circuitry is further configured to generate instructions to disable a feature of a headphone.

In Example 13, the subject matter of Example(s) 1-12, further includes wherein the communication circuitry is further configured to generate instructions to disable a noise cancellation feature of the headphone.

In Example 14, the subject matter of Example(s) 1-13, further includes wherein the communication circuitry is further configured to generate instructions to disable the noise cancellation feature from a direction.

In Example 15, the subject matter of Example(s) 1-14, further includes wherein the communication circuitry is further configured to generate instructions to disable the noise cancellation feature for a spectral pattern.

In Example 16, the subject matter of Example(s) 1-15, further includes wherein the communication circuitry is further configured to generate the detection signal for communication with an autonomous driving system of the vehicle.

In Example 17, the subject matter of Example(s) 1-16, further includes wherein the communication circuitry is further configured to generate the detection signal for a radar receiver of the vehicle.

In Example 18, the subject matter of Example(s) 1-17, further includes wherein the alert further includes instructions to illuminate a display of a user equipment.

In Example 19, a method for generating an alert, the method comprising: identifying a range of frequencies associated with vehicular communication; determining that a frequency of a received signal is within the range of frequencies associated with vehicular communication; determining that the received signal is from a vehicle; and generating the alert that the vehicle is approaching.

In Example 20, the subject matter of Example(s) 19, further includes transmitting a detection signal to the vehicle.

In Example 21, the subject matter of Example(s) 19 and 20, further includes determining that a source of the signal is getting closer.

In Example 22, the subject matter of Example(s) 19-21, further includes wherein the alert includes instructions to generate an audible sound.

In Example 23, the subject matter of Example(s) 19-22, further includes wherein the alert includes instructions to generate a visual indication.

In Example 24, the subject matter of Example(s) 19-23, further includes wherein the alert includes instructions to generate the audible sound as a gas engine vehicle sound.

In Example 25, the subject matter of Example(s) 19-24, further includes wherein the alert includes instructions to generate the audible sound as a vehicle horn sound.

In Example 26, the subject matter of Example(s) 19-25, further includes wherein the alert is associated with an urgency level.

In Example 27, the subject matter of Example(s) 19-26, further includes wherein the alert includes instruction to cause a user equipment to vibrate.

In Example 28, the subject matter of Example(s) 19-27, further includes wherein the alert includes instruction to cause a user equipment to disable audio playback.

In Example 29, the subject matter of Example(s) 19-28, further includes wherein the alert includes instruction to cause a user equipment to lower a volume.

In Example 30, the subject matter of Example(s) 19-29, further includes wherein the alert includes instruction to cause a user equipment to disable a feature of a headphone.

In Example 31, the subject matter of Example(s) 19-30, further includes wherein the alert includes instruction to cause a user equipment to disable a noise cancellation feature of the headphone.

In Example 32, the subject matter of Example(s) 19-31, further includes wherein the alert includes instructions to disable the noise cancellation feature from a direction.

In Example 33, the subject matter of Example(s) 19-32, further includes wherein the alert includes instructions to disable the noise cancellation feature for a spectral pattern.

In Example 34, the subject matter of Example(s) 19-33, further includes wherein the detection signal is configured for communication with an autonomous driving system of the vehicle.

In Example 35, the subject matter of Example(s) 19-34, further includes wherein the detection signal is configured for communication with a radar receiver of the vehicle.

In Example 36, the subject matter of Example(s) 19-35, further includes wherein the alert comprises instructions to cause a user equipment is configured to illuminate a display upon receipt of the alert.

In Example 37, one or more non-transitory computer readable media comprising programmable instructions thereon, that when executed by one or more processors of a device, cause the device to perform any one of the methods of Examples 19-36.

In Example 38, a system comprising one or more devices according to any of Examples 1-18, the system configured to implement a method according to any of Examples 19-36.

In Example 39, a means for implementing any of the Examples 1-18.

In Example 40, a communication circuitry for generating an alert, the communication circuitry includes one or more processors configured to: identify a range of frequencies associated with vehicular communication or radar; determine that a frequency of a received signal is within the range of frequencies associated with vehicular communication; determine that the received signal is from a vehicle; and generate the alert that the vehicle is approaching.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A communication circuitry for generating an alert, the communication circuitry comprising a receiver configured to receive a radio frequency signal;
the communication circuitry further comprising one or more processors configured to:
identify a range of frequencies associated with vehicular communication;
analyze a pulse width of the received radio frequency signal;
estimate signal parameters based on the pulse analysis of the received radio frequency signal;
classify a pulse of the received radio frequency signal based on the estimated signal parameters;
determine that a frequency of the received radio frequency signal is within the range of frequencies associated with vehicular communication based on the pulse classification;
determine that the received radio frequency signal is from a vehicle; and
generate the alert indicating the vehicle is approaching.

2. The communication circuitry of claim 1, further configured to transmit a detection signal to the vehicle.

3. The communication circuitry of claim 2, wherein the communication circuitry is further configured to generate the detection signal for communication with an autonomous driving system of the vehicle.

4. The communication circuitry of claim 1, further configured to determine that a source of the received radio frequency signal is getting closer.

5. The communication circuitry of claim 1, wherein the alert comprises instructions to generate an audible sound.

6. The communication circuitry of claim 1, wherein the alert comprises instructions to generate a visual indication.

7. The communication circuitry of claim 1, wherein the alert is associated with an urgency level.

8. The communication circuitry of claim 1, wherein a user equipment is configured to vibrate upon receipt of the alert.

9. The communication circuitry of claim 1, wherein the communication circuitry is further configured to generate instructions to disable a headphone feature.

10. The communication circuitry of claim 1, wherein pulse analysis includes to determine whether the received radio frequency signal comprises a single frequency.

11. The communication circuitry of claim 10, wherein the received radio frequency signal is determined to not comprise a single frequency; and
the estimated signal parameters include a linear frequency modulation estimation.

12. The communication circuitry of claim 10, wherein the received radio frequency signal is determined to comprise a single frequency; and
the estimated signal parameters include at least one of a phase coded pulse estimation, a simple pulse estimation, or a staggered pulse estimation.

13. A method for generating an alert, the method comprising:
identifying a range of frequencies associated with vehicular communication;
analyzing a pulse width of the received radio frequency signal;
estimating signal parameters based on the pulse analysis of the received radio frequency signal;
classifying a pulse of the received radio frequency signal based on the estimated signal parameters;
determining that a frequency of the received radio frequency signal is within the range of frequencies associated with vehicular communication based on the pulse classification;
determining that the received radio frequency signal is from a vehicle; and
generating the alert that the vehicle is approaching.

14. The method of claim 13, further comprises transmitting a detection signal to the vehicle.

15. The method of claim 14, wherein the detection signal is configured for communication with an autonomous driving system of the vehicle.

16. The method of claim 14, wherein the detection signal is configured for communication with a radar receiver of the vehicle.

17. The method of claim 13, further comprises determining that a source of the signal is getting closer.

18. The method of claim 13, wherein the pulse analysis includes determining whether the received radio frequency signal comprises a single frequency; and
further estimating the signal parameters based on the determination.

19. The method of claim 18, further comprising matching the estimated signal parameters of the received radio frequency signal with elements of a pulse database containing information associated with emitted vehicular radar signals.

* * * * *